(12) United States Patent
Baril et al.

(10) Patent No.: US 8,206,526 B2
(45) Date of Patent: Jun. 26, 2012

(54) PROCESS FOR REDUCING WRINKLES IN COMPOSITE LAMINATED STRUCTURES

(76) Inventors: Claude Baril, Laval (CA); Kevin P. Steck, Puyallup, WA (US); Scott Saunders, Halifax (CA); Michael Davison, Lunenburg (CA); Maurice Guitton, Lunenburg (CA); Mike Myra, Lunenburg (CA); Troy Brake, Lunenburg (CA)

( * ) Notice: Subject to any disclaimer, the term of this patent is extended or adjusted under 35 U.S.C. 154(b) by 325 days.

(21) Appl. No.: 12/356,556

(22) Filed: Jan. 21, 2009

(65) Prior Publication Data

US 2010/0043957 A1   Feb. 25, 2010

Related U.S. Application Data

(60) Provisional application No. 61/189,499, filed on Aug. 20, 2008.

(51) Int. Cl.
*B32B 41/00* (2006.01)
(52) U.S. Cl. .......... 156/64; 156/161; 156/187; 156/189; 156/196; 156/200; 156/218; 156/221; 156/380.1
(58) Field of Classification Search .................. 156/64, 156/187, 189, 196, 200, 218, 221, 380.1, 156/161
See application file for complete search history.

(56) References Cited

U.S. PATENT DOCUMENTS

| | | | |
|---|---|---|---|
| 3,340,714 A | 9/1967 | Karl-Heinz Pohl et al. | |
| 3,932,575 A | 1/1976 | Andersson | |
| 4,169,186 A | 9/1979 | Tazaki et al. | |
| 4,225,553 A | 9/1980 | Hirota et al. | |
| 5,207,848 A | 5/1993 | Mahoney et al. | |
| 5,223,067 A * | 6/1993 | Hamamoto et al. | 156/173 |
| 5,411,463 A | 5/1995 | Brookstein | |
| 5,576,081 A | 11/1996 | Sandt | |
| 2007/0175031 A1* | 8/2007 | Pham et al. | 29/889.2 |

* cited by examiner

*Primary Examiner* — George Koch (57) ABSTRACT

A wrinkle control process for manufacturing a closed cross-sectional, composite laminate structure on a male tool cured under temperature and pressure. The process includes the step of creating a plurality of filled or unfilled depressions at strategic locations in the laminate prior to curing. The depressions are created by depression forming elements that have a predetermined size designed to create a depression in under plies, alone or combined with intensification techniques. The depressions may be left unfilled or be partially or completely filled. Depression forming elements are removed after cure or remain part of the structure. The number of elements being determined by the following equation: $N=(OPL-OPC) \div (Li-Lj)$, where OPL is the outside perimeter of the composite structure after lay-up and prior to curing, OPC is the outside perimeter of the composite structure after lay-up and after curing, Li is the linear length of the composite segment formed by a depression forming element and Lj is the theoretical linear length of the corresponding composite segment without a depression.

5 Claims, 7 Drawing Sheets

PROCESS FOR REDUCING WRINKLES IN COMPOSITE LAMINATED STRUCTURES

This is a utility patent application which claims benefit of U.S. Provisional Application No. 61/189,499, filed on Aug. 20, 2008.

COPYRIGHT NOTICE

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to manufacturing processes that use adhesive or chemicals, and more particularly to such processes that are used to manufacture composite laminated structures.

2. Description of the Related Art

Manufacturing parts using composite laminated materials is becoming more popular. In many instances, the structural qualities of composite laminated material match or exceed the, structural qualities of metals. Durability of parts made of composite laminated material may also exceed parts made of metal. In most instances, the weight of parts made of composite laminated material may be less than parts made of metal.

Parts made of composite laminate material consist of a plurality of thin laminated layers, called plies, placed on a male tool (usually in a mold or around a mandrel). Once the part is formed, the laminated plies are cured at a predetermined temperature and for a predetermined time period to prepare the final part. The number of cures varies for the composite material used and the structural characteristics required.

One drawback with current composite laminated processes is that random wrinkles are sometimes created in the part due to compaction during the cure which wrinkles can impact the structural performance and/or cosmetic appearance of a laminated composite structure.

SUMMARY OF THE INVENTION

A wrinkle control process for manufacturing composite laminate structures on a tool cured under temperature and pressure. The process includes the step of creating a plurality of depressions at predetermined circumferential and ply locations in the laminated composite structure. The depressions are created by depression forming elements spaced apart on selected plies. The depression forming elements have a predetermined size and may be made of material designed to create a depression, alone or combined with pressure intensification techniques, in the underlying plies. The number of depression forming elements used in the laminate being determined by the following equation: $N=(OPL-OPC)$ and divided by $(L_i-L_j)$, where OPL is outside perimeter length of the composite structure after lay-up and prior to curing, OPC is the outside perimeter length of the composite structure after lay-up and after curing, $L_i$ is the linear length of the composite segment formed by a depression and $L_j$ is the theoretical length of the composite segment without the depression (as if no depression were formed). The above equation may be used with a closed tubular or non-tubular structure. The above equation may also be used on a hybrid structure made up of a tubular or non-tubular section. The depressions may be left unfilled or be partially or completely filled during or after the creation of the depressions. The process may be repeated until the desired composite structure is manufactured.

DESCRIPTION OF THE PREFERRED EMBODIMENT(S)

Figure 1:
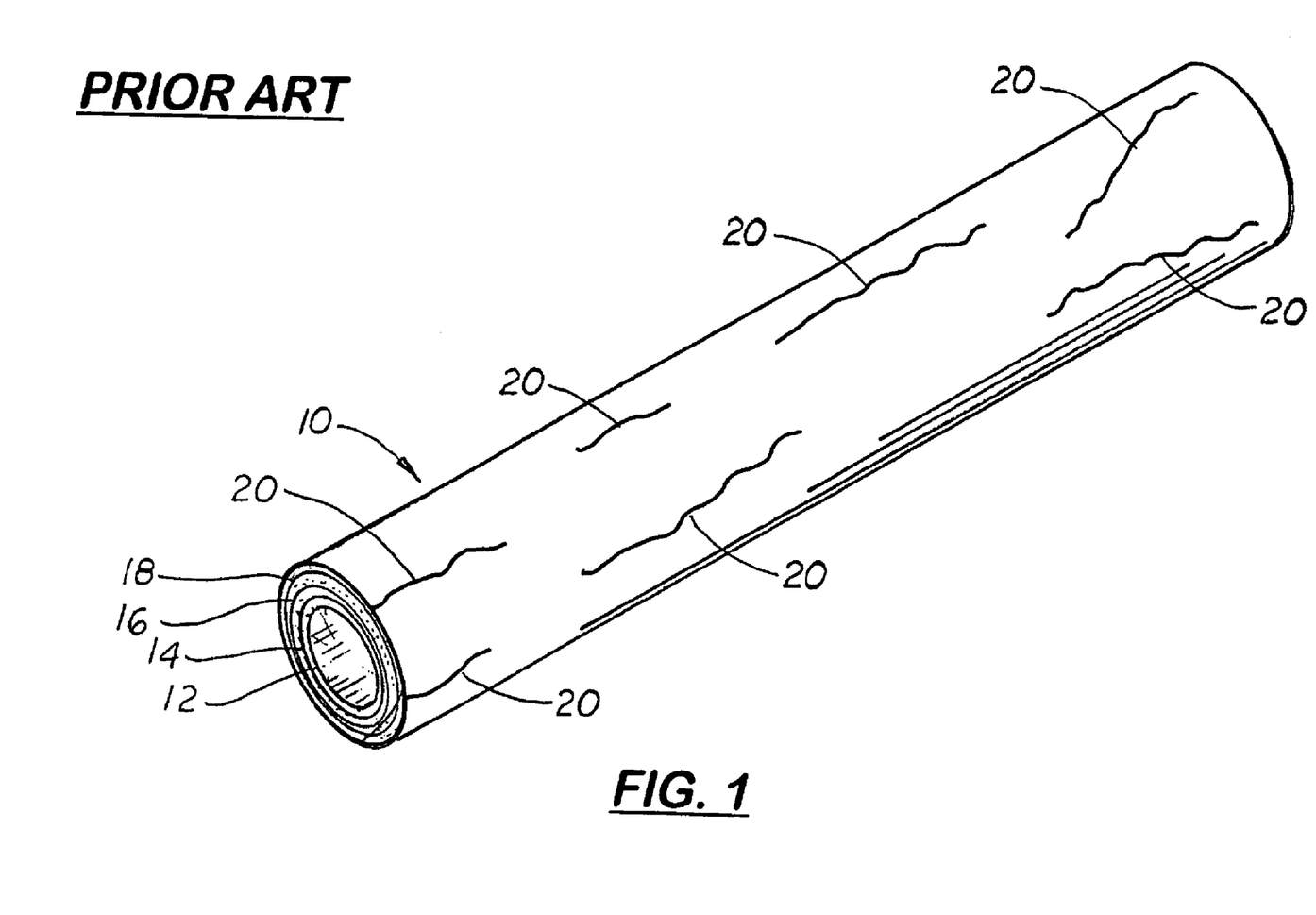
FIG. 1 is a perspective view of a tubular, composite structure found in the prior art with a plurality of random wrinkles formed on its exterior surface.

Disclosed herein is a wrinkle control process of manufacturing closed cross-sectional, composite laminated structures on a tool cured under temperature and pressure. The process is specifically designed to eliminate random wrinkles or similar imperfections formed in the laminate or on the exterior surfaces of a closed cross-sectional structure, tubular or non-tubular structure that undergoes compaction during the curing stage, as shown in FIG. 1.

The process of manufacturing a composite structure 11 includes the step of creating or building a laminated structure on a male tool 80, such as a mold or mandrel, and then curing the structure 11 using pressure and heat. The size and shape of the structure 11 the type of composite material used, the thickness of each ply, the number of plies 12-18 and the number of curing steps depends on the structure's application-specific, design requirements.

Figures 2, 3:
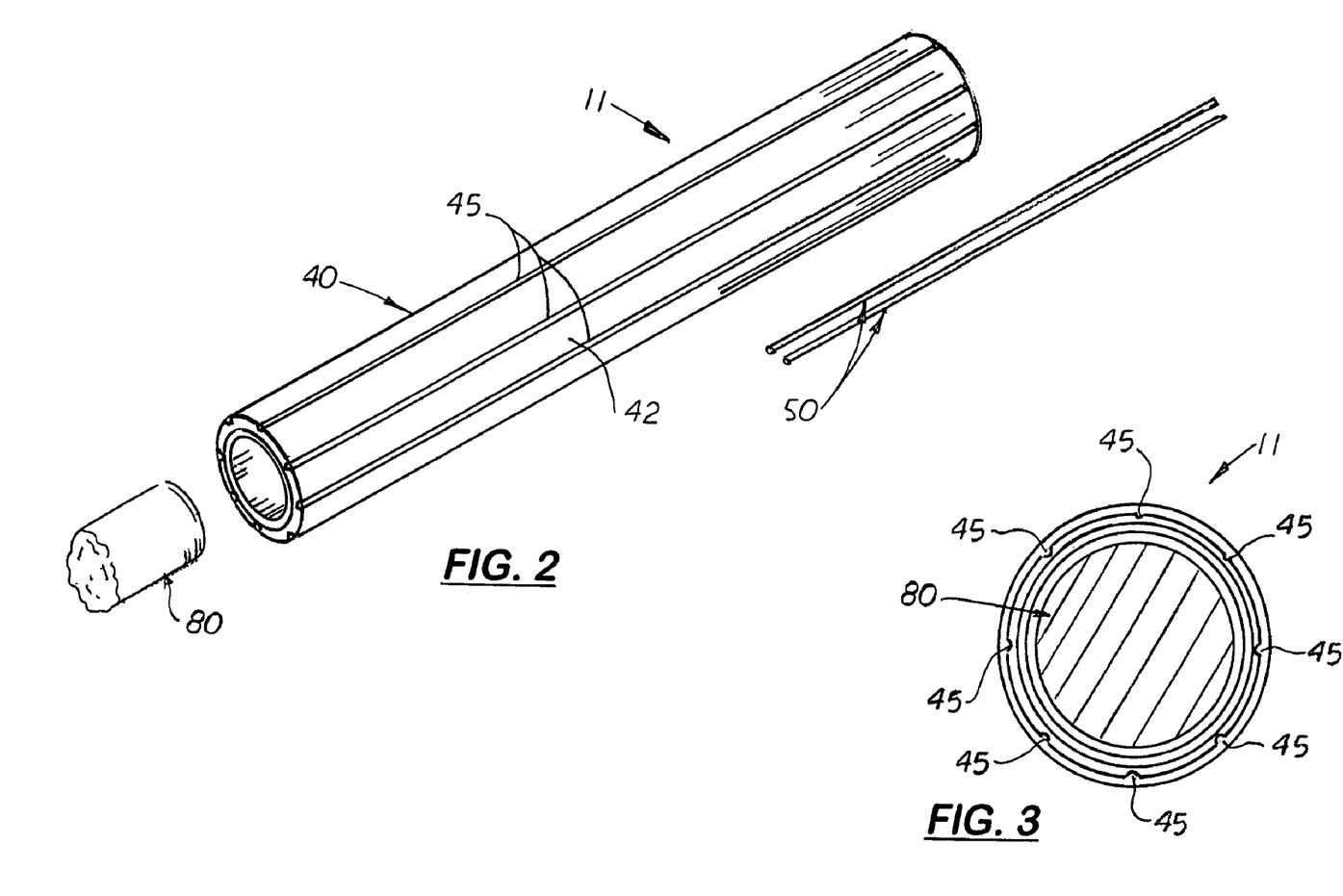
FIG. 2 is a perspective view of a tubular composite laminate structure with a plurality of longitudinally aligned depressions created during cure by depression forming elements which have been removed.
FIG. 3 is an end elevational view of a tubular composite structure mounted on a male tool showing the relative locations of a plurality of depressions formed on an interior ply.

As shown in FIG. 2, the process includes the step of creating a plurality of depressions 45 at predetermined locations and depths in the stack up. The depressions 45 are created by depression forming elements 50 strategically spaced circumferentially on a selected ply. The depression forming elements 50 create depressions 45 in the underlying plies alone or combined with pressure intensification techniques. The depression forming elements 50 may be made of material designed to remain in the composite structure 11, or designed to be removed from the composite structure 11 after curing. In each instance, a depression 45 is created by each depression forming element 50. Such depression 45 may be left unfilled or be partially or completely filled. The size, shape, and type of depression forming elements 50 are selected based on the capability of reliably forming depressions 45 in underlying plies at selected locations when cured.

In the first embodiment, the composite structure 11 is made of carbon with an epoxy matrix. The structure 11 is made of plurality of plies only (four shown 12-18) with each ply measuring approximately 0.1 mm to 0.5 mm in thickness. The depression forming elements 50 are thin, longitudinally aligned structures usually circular in cross-section. Prior to cure, a plurality of linear elements 50 are circumferentially spaced and axially aligned over the outside surface of the ply stack-up. In some applications, a single placement of depression forming elements 50 at a selected ply followed by curing is sufficient. In other applications, multiple placements of depression forming elements 50 at several ply locations followed by curing are needed.

The depression forming elements 50 may be located at any circumferential location. The precise location of the depression forming elements 50 is usually limited by geometry considerations, method of attachment; maximum number of cures, maximum or allowed depth of depressions, perimeter spacing, lay-up guidelines, cosmetics and other application-specific design requirements.

The depression forming elements can be of changeable size, shape, material and type along their length. They may be made of metallic, non-metallic material or a combination thereof. The depression forming elements may be made of un-cured or cured composite material. As stated above, the depression forming elements may be removable or retained in the laminate structure.

Figure 4:
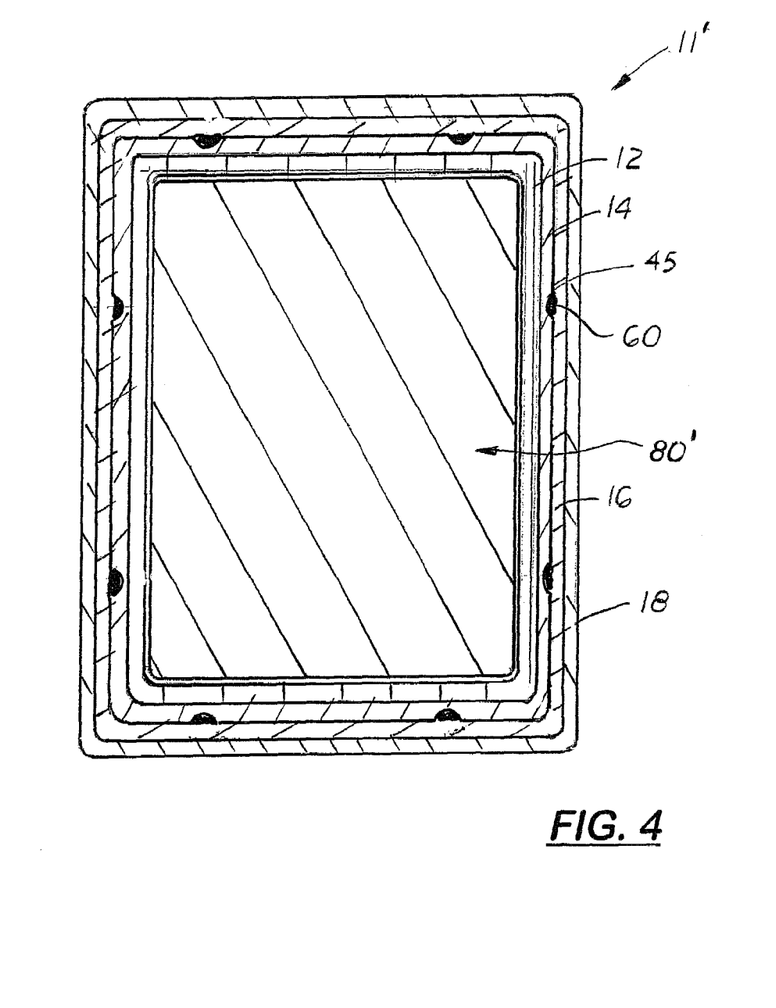
FIG. 4 is an end elevational view of a rectangular composite structure mounted on a male tool showing the relative locations of a plurality of depressions formed on an interior ply.
Figure 5:
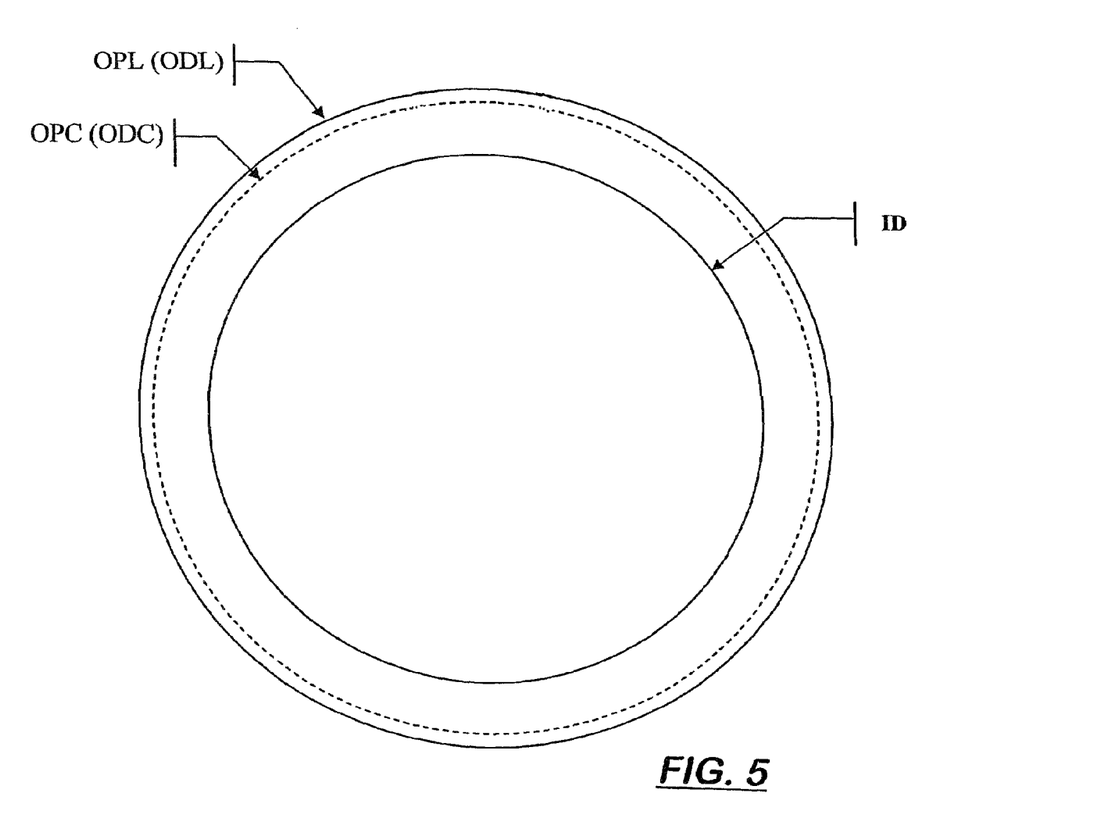
FIG. 5 is a side elevational view of a tubular composite structure denoting the location of the OPL (ODL) and the OPC (ODC) of a tubular composite structure.
Figure 6:
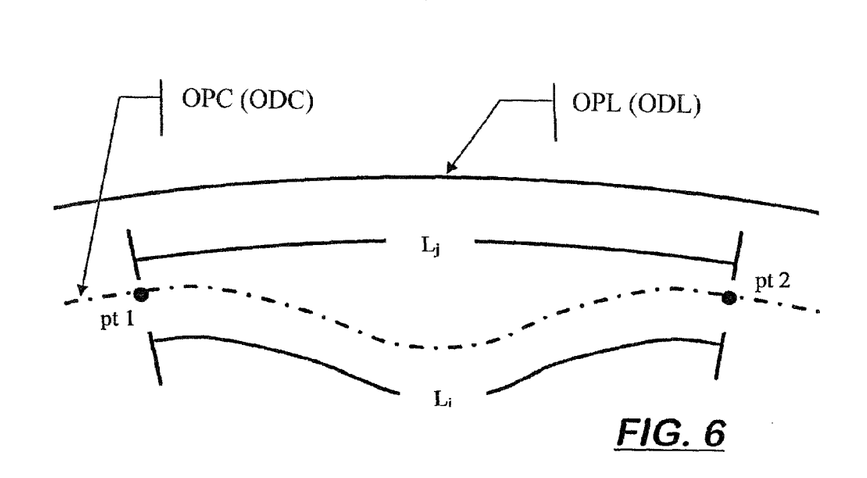
FIG. 6 is an exploded elevational view of the tubular composite structure showing in FIG. 5 showing the segment of the composite structure that forms a depression in greater detail.
Figure 7A:
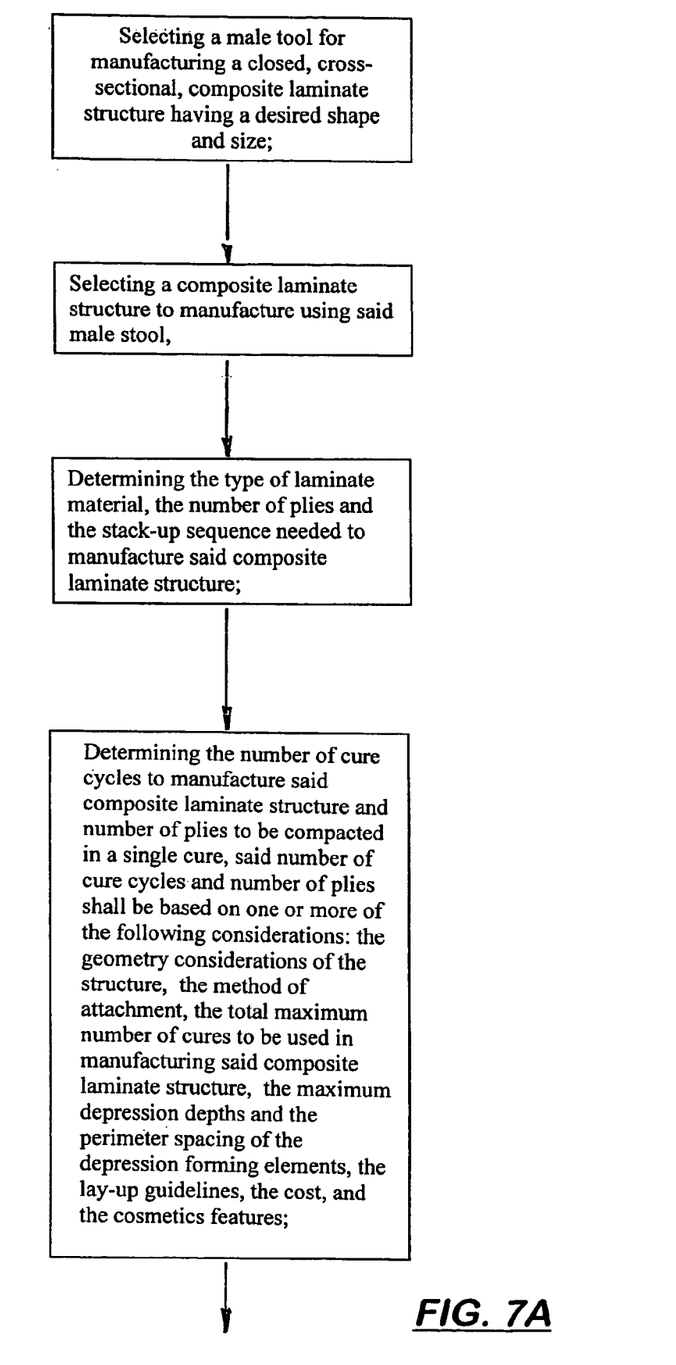
FIGS. 7A-7C is a flow diagram of the wrinkle control process described herein
Figure 7B:
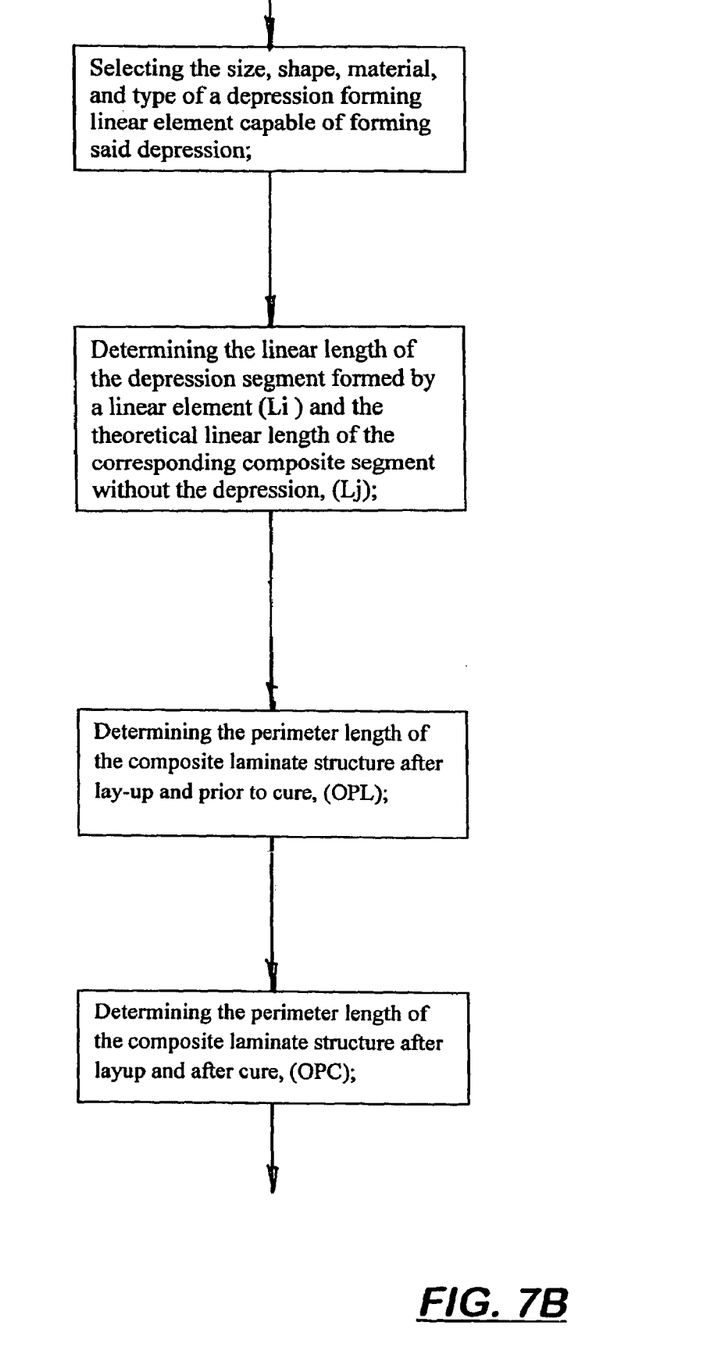
Figure 7C:
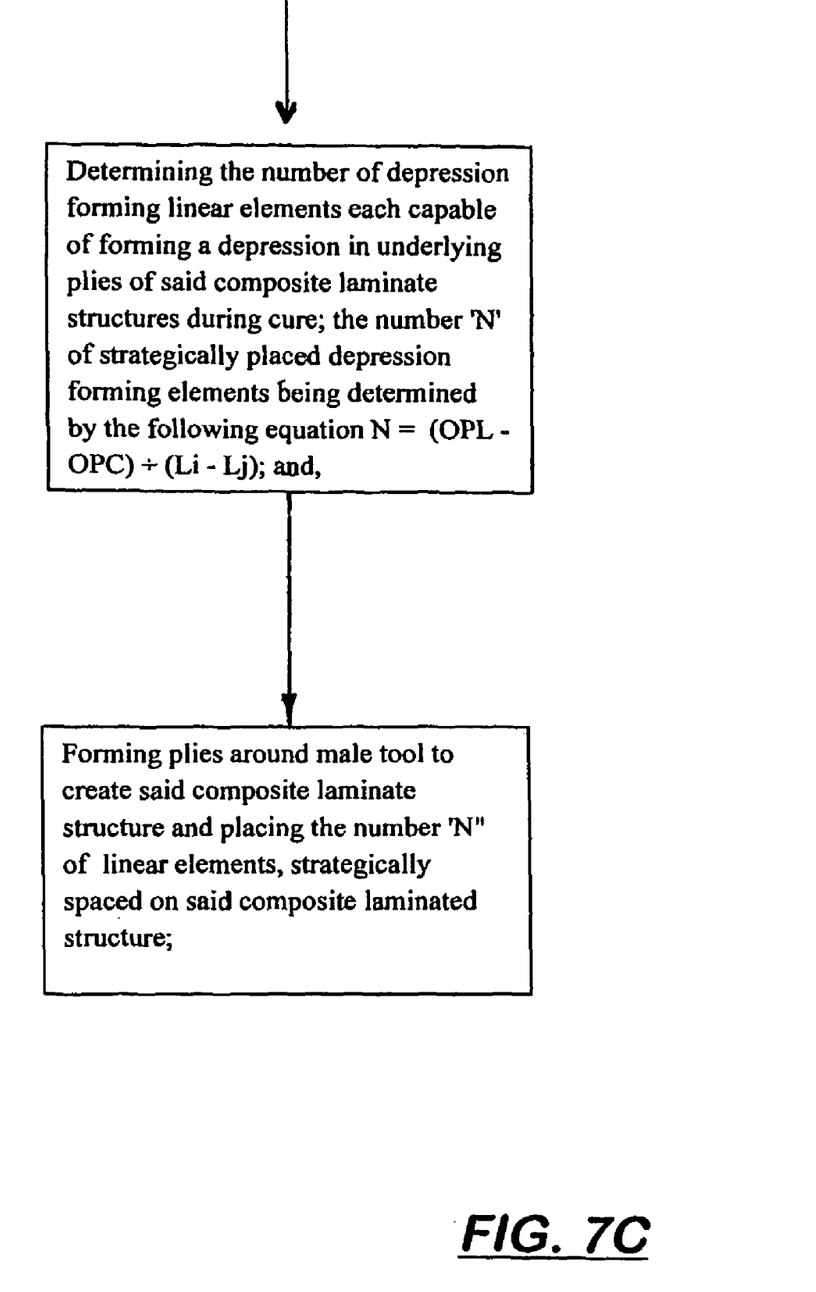

The process may be used to manufacture close cross-sectional composite structures, including but not limited to the circular or tubular structures as shown in FIGS. 2, 3, 5 and 6, or the square or rectangular cross-sectional structures 11' made of a plurality of laminated plies placed around a male tool 80' as shown in FIG. 4. In FIG. 4, depressions 45 have been formed in the laminate layer which may be filled with suitable material 60. It should be understood, that the process may be used to make hybrid structures made of a combination of tubular or non-tubular sections.

The total number of depression forming elements 50 used in a structure 11 is based on the following equation: N (the number of depression forming elements used) being determined by the following equation: N=(OPL−OPC) and divided by (Li−Lj), where OPL is outside perimeter length of the composite structure after lay-up and prior to curing. OPC is the outside perimeter length of the composite structure after lay-up and after curing, Li is the linear length of the composite segment formed by a depression and Lj is the theoretical length of the composite segment without the depression. (as if no depression were formed). The above equation may be used with either tubular or non-tubular structures. When used with tubular composite structures, the equation is N=π(ODL−ODC)÷(Li−Lj), where ODL is the outside diameter of the composite structure after lay-up and prior to curing, ODC is the outside diameter of the composite structure after lay-up and after curing, Li is the linear length of the composite segment formed by a depression and Lj is the theoretical linear length of the composite segment without a depression (as if no depression were formed).

In summary, the wrinkle control process for closed cross-sectional, composite laminate structure, comprises the following steps:

a. selecting a male tool for manufacturing a closed, cross-sectional, composite laminate structure having a desired shape and size;

b. selecting a composite laminate structure to manufacture using said male tool;

c. determining the type of laminate material, the number of plies and the stack-up sequence needed to manufacture said composite laminate structure;

d. determining the number of cure cycles to manufacture said composite laminate structure and number of plies to be compacted in a single cure, said number of cure cycles and number of plies shall be based on one or more of the following considerations: the geometry considerations of the structure, the method of attachment, the total maximum number of cures to be used in manufacturing said composite laminate structure, the maximum depression depths and perimeter spacing of depression forming elements, the lay-up guidelines, the cost, and the cosmetics features;

e. selecting the size, shape, material, and type of at least one depression forming element capable of forming a depression;

f. determining the linear length of the depression segment formed by a depression forming element (Li) and the theoretical linear length of the corresponding composite segment without the depression (Lj);

g. determining the perimeter length of the composite laminate structure after lay-up and prior to cure (OPL);

h. determining the perimeter length of the composite laminate structure after lay-up and after cure (OPC);

i. determining the number of depression forming elements each capable of forming a depression in underlying plies of said composite laminate structures during cure; the number 'N' of strategically placed depression forming elements being determined by the following equation N=(OPL−OPC)÷(Li−Lj); and, j. forming plies around male tool to create said composite laminate structure and placing the number 'N" of depression forming elements, strategically spaced on said composite laminated structure.

In compliance with the statute, the invention described herein has been described in language more or less specific to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A process for controlling the formation of wrinkles in a closed cross-sectional, composite laminated structure during manufacturing that cures by heat and compaction, comprising the following steps:

a. selecting a closed cross-sectional, composite laminated structure to be made by curing using heat and compaction b. selecting a male tool configured for manufacturing said composite laminated structure;

c. selecting a plurality of depression forming elements each used to form a depression in a ply layer of said composite laminated structure;

d. laying up a stack of plies made of composite material around said male tool to form said cross-sectional composite laminated structure selected in step a;

e. selecting a segment of an outside ply layer to create a depression in said ply layer of said composite laminated structure;

f. determining the theoretical length (Lj) of a segment on said outside ply layer and determining the linear length of said segment when a depression is formed by said depression forming element (Li);

g. determining the perimeter length of the lay-up composite laminated structure prior to curing (OPL);
h. determining the perimeter length of the lay-up composite laminated structure after curing (OPC);
i. determining the total number of depression (N) forming elements to be used on the said outside ply using the following equation N=(OPL−OPC)÷(Li−Lj);
j. positioning said (N) number of depression forming elements on said outside ply and around said composite laminated structure prior to cure;
k. laying up a stack of plies made of composite material around said male tool and around said depression forming elements to form a desired closed cross-sectional composite laminated structure; and,
l. curing said lay-up composite-laminated structure using heat and compaction.

2. The process as recited in claim 1, wherein the numerator in step i (OPL−OPC) becomes π (ODL−ODC).

3. The process as recited in claim 1, further including the step m of filling the depressions created by said depression forming elements that are removed after curing.

4. The process as recited in claim 1, wherein said depression forming elements selected in Step c are made of composite material.

5. The process as recited in claim 1, wherein said depression forming elements selected in Step c are made of metallic material.

* * * * *